No. 650,154. Patented May 22, 1900.
A. OWENS.
PULLEY FASTENING.
(Application filed Feb. 12, 1900.)
(No Model.)

Witnesses:
David C. Walter
L. E. Brown

Inventor.
Archibald Owens
By his Attorney

UNITED STATES PATENT OFFICE.

ARCHIBALD OWENS, OF FLORIDA, OHIO.

PULLEY-FASTENING.

SPECIFICATION forming part of Letters Patent No. 650,154, dated May 22, 1900.

Application filed February 12, 1900. Serial No. 4,865. (No model.)

*To all whom it may concern:*

Be it known that I, ARCHIBALD OWENS, a citizen of the United States, residing at Florida, Henry county, Ohio, have invented certain new and useful Improvements in Pulley-Fastenings, of which the following is a specification.

Heretofore pulleys have usually been secured to their shafts either by means of keys engaging keyways in the shaft and in the hub of the pulley or by set-screws passing through the hub of the pulley and projecting against the shaft. To permit a pulley to be engaged with its shaft at any point along the length of the shaft by the former method requires a keyway to be cut the whole length of the shaft, which is very expensive, especially in line-shafting. To avoid this, short keyways have been cut in the shaft at the points where the pulleys are to be applied; but when an additional pulley is to be added to the shaft the labor, expense, and delay attendant upon the cutting of an additional short keyway are great. The use of set-screws is found to be unsatisfactory except where the strains are light, because of the slight area of contact between the screw and the shaft.

My invention relates to and its object is to provide a cheap, simple, and efficient device for securing a pulley upon its shaft, which device shall overcome the objections here indicated, and more particularly to provide means whereby a pulley may be secured to its shaft without cutting any keyway in the shaft and whereby a pulley may be easily and readily secured at any point along the shaft as firmly and rigidly as may be desired. I attain these objects by means of the devices and arrangement of parts hereinafter described, and shown and illustrated in the accompanying drawings, made part hereof, in which—

Figure 1:
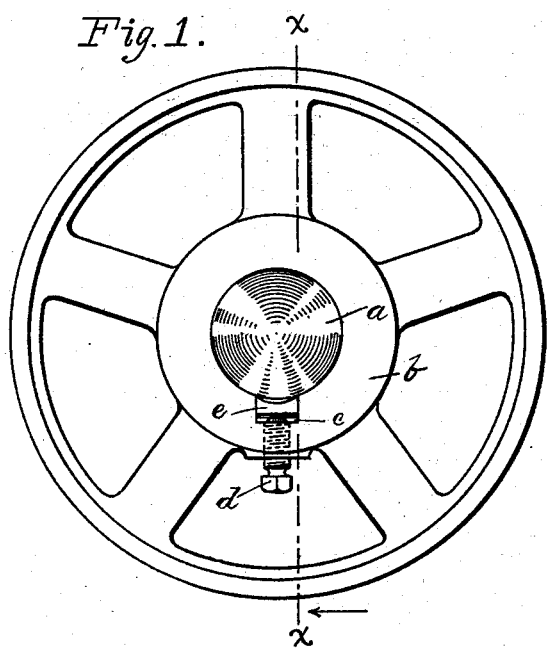
Figure 2:
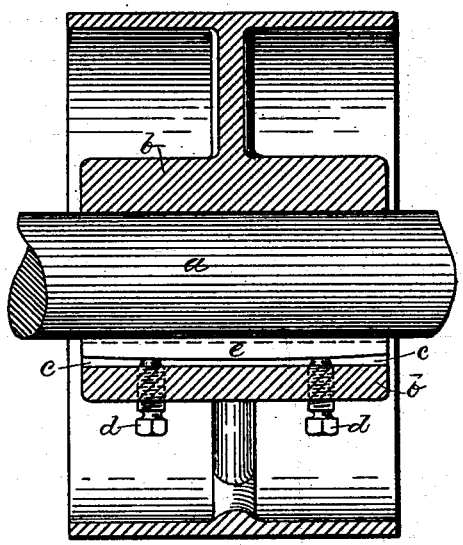
Figure 4:
Figure 3:

Figure 1 is a transverse sectional view of a pulley-hub engaged upon its shaft by means of my device; Fig. 2, a central longitudinal sectional view of the same; Fig. 3, a side elevation of the spring compression-bar hereinafter referred to; Fig. 4, an end elevation of the same, and Fig. 5 an end elevation of a modified form of said compression-bar.

Like letters of reference indicate like parts throughout the drawings.

In the drawings, $a$ is the shaft, and $b$ the hub of the pulley to be secured upon the shaft. In the face of the bore of the hub and parallel with the axis thereof is cut or formed a channel or groove $c$. Through the hub radially are screw-threaded holes, which lead into the channel or groove $c$. In these screw-threaded holes are set-screws $d$.

$e$ is a bar formed, preferably, of resilient tool-steel. This bar is preferably of the same length as the slot, although it may be longer. The bar $e$ is somewhat thicker at its middle than at its ends and is bowed at its middle inwardly toward the shaft. That side of the bar which is next to the shaft is concaved laterally in the arc of a circle of shorter radius than the circle of the shaft, so that the margins of the bar form angles or edges which may engage the shaft.

Figure 5:
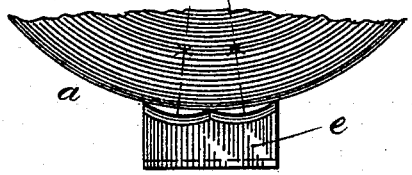

The inner face of the bar $e$ may, instead of being concave in cross-section, be longitudinally corrugated, as illustrated in Fig. 5.

The operation of my device is as follows: The pulley being upon its shaft at the desired point and screws $d$ being partly withdrawn, the bar $e$, with its curved or corrugated face turned toward the shaft, is slipped longitudinally into the slot $c$. The screws $d$ are now set up against the bar. The middle or inwardly-bowed portion of the bar first presses against the shaft $a$, and as the screws $d$ are set up the extremities of the bar yield and the bar throughout its whole length is straightened and brought into close contact with the shaft, clamping and gripping the shaft tightly between the bar and the opposite side of the hub, thus bringing the pulley and shaft into such close union that they invariably revolve together.

Instead of the set-screws $d$ cotters or wedges may be employed to force the compression-bar into a right line and against the shaft; but this would of course be the obvious mechanical equivalent of the set-screws $d$, which in practice are found preferable.

Having described my invention, what I claim, and desire to secure by Letters Patent, is—

1. In a pulley-fastening, a bar of resilient metal having its inner face longitudinally bowed or curved, means for forcing said bar inwardly toward the axis of the pulley, and means for holding said bar parallel with the axis of the pulley.

2. In a pulley-fastening, a compression-bar of resilient metal, having its inner face curved or bowed longitudinally, and longitudinal projections upon the inner face of said compression-bar.

3. A pulley-fastening comprising a shaft, a pulley thereon having a hub provided with a longitudinal groove in its inner face, a bowed compression-bar of resilient metal in said groove, and set-screws projecting inwardly against said bar, whereby, by the action of said set-screws, the bowed compression-bar is forced into contact with the shaft throughout the length of said compression-bar.

ARCHIBALD OWENS.

In presence of—
L. E. BROWN,
F. M. DOTSON.